(12) United States Patent
Brezinski

(10) Patent No.: US 6,584,939 B1
(45) Date of Patent: Jul. 1, 2003

(54) ANIMAL COAT

(76) Inventor: Jessica M. Brezinski, 2018 E. 11 Mile Rd., Royal Oak, MI (US) 48067

( * ) Notice: Subject to any disclaimer, the term of this patent is extended or adjusted under 35 U.S.C. 154(b) by 0 days.

(21) Appl. No.: 10/227,941

(22) Filed: Aug. 26, 2002

Related U.S. Application Data

(60) Provisional application No. 60/346,196, filed on Oct. 19, 2001.

(51) Int. Cl.$^7$ ............................................... A01K 29/00
(52) U.S. Cl. ....................................... 119/850; D30/145
(58) Field of Search ......................... 119/850; 54/79.1, 54/79.2, 79.3; D30/145

(56) References Cited

U.S. PATENT DOCUMENTS

| | | | | |
|---|---|---|---|---|
| 3,248,852 A | * | 5/1966 | Schwartz | 54/79.1 |
| D250,138 S | * | 10/1978 | Bartolac et al. | D30/145 |
| 4,342,185 A | | 8/1982 | Pellew | |
| 4,489,676 A | | 12/1984 | Colquist | |
| 4,527,991 A | | 7/1985 | Msarsa | |
| 4,955,182 A | | 9/1990 | Newman | |
| D312,151 S | | 11/1990 | Dickey | |
| D313,291 S | | 12/1990 | Shanley | |
| 5,003,756 A | | 4/1991 | Mazzotta, Sr. | |
| 5,056,160 A | | 10/1991 | Buchanan | |
| 5,060,458 A | | 10/1991 | Curtis | |
| D329,927 S | | 9/1992 | Thomas | |
| 5,293,840 A | | 3/1994 | Wedlick | |
| 5,341,765 A | | 8/1994 | McComb | |
| 5,359,963 A | | 11/1994 | Jesse, Jr. et al. | |
| 5,361,563 A | * | 11/1994 | Llamas | 54/79.2 |
| D363,572 S | * | 10/1995 | Obenchain | D30/145 |
| 5,458,094 A | * | 10/1995 | Proshan | 119/850 |
| 5,537,954 A | | 7/1996 | Beeghly et al. | |
| D372,563 S | | 8/1996 | Waugh, Jr. | |
| D373,228 S | | 8/1996 | Brown | |
| D374,315 S | * | 10/1996 | Caditz | D30/145 |
| D379,687 S | * | 6/1997 | Curtis | D30/145 |
| 5,769,030 A | * | 6/1998 | Acoff | 119/712 |
| D397,533 S | | 8/1998 | Lidis | |
| 5,839,393 A | | 11/1998 | Rupp et al. | |
| D403,132 S | | 12/1998 | Campbell-Henderson | |
| D404,852 S | | 1/1999 | Powell-Lesnick | |
| 5,893,173 A | | 4/1999 | Bray | |
| D413,186 S | * | 8/1999 | Brown | D30/145 |
| 5,941,199 A | * | 8/1999 | Tamura | 119/850 |
| 5,996,537 A | | 12/1999 | Caditz | |
| D419,270 S | * | 1/2000 | Ruscitti | D30/145 |
| 6,024,055 A | | 2/2000 | Jesse, Sr. et al. | |
| 6,058,890 A | * | 5/2000 | Harrell | 119/850 |
| D427,734 S | * | 7/2000 | Balzarini | D30/145 |
| 6,085,698 A | | 7/2000 | Klein | |
| 6,089,194 A | | 7/2000 | LaBelle | |
| 6,119,635 A | | 9/2000 | Powell-Lesnick | |
| 6,138,611 A | | 10/2000 | Thielemann | |
| 6,234,117 B1 | * | 5/2001 | Spatt | 119/850 |
| 6,267,083 B1 | * | 7/2001 | Chimienti | 119/850 |
| 6,443,101 B1 | * | 9/2002 | Fazio | 119/792 |
| 6,467,244 B1 | * | 10/2002 | Kelley et al. | 54/79.2 |
| 6,477,988 B2 | * | 11/2002 | Burnett | 119/850 |
| 6,481,383 B1 | * | 11/2002 | Ross et al. | 119/850 |
| D470,275 S | * | 2/2003 | Lidis | D30/145 |
| 2003/0029389 A1 | * | 2/2003 | Sporn | 119/850 |

* cited by examiner

*Primary Examiner*—Yvonne Abbott
(74) *Attorney, Agent, or Firm*—Young & Basile, PC

(57) ABSTRACT

An animal coat and method of making the coat for protection and insulation of domestic and undomestic animals. The coat includes a first and second lateral strap positioned behind the animal front legs which pass under the animal chest and engage one another in an overlapping fashion. The coat further includes a chest strap passing between the front legs for overlapping engagement with the lateral straps to easily secure and remove the coat from the animal.

14 Claims, 4 Drawing Sheets

ANIMAL COAT

CROSS-REFERENCE TO RELATED APPLICATION

This application claims the benefit of U.S. Provisional Patent Application No. 60/346,196, filed Oct. 19, 2001.

FIELD OF THE INVENTION

The present invention relates to protective clothing for animals, particularly a coat for animals having protective and insulating properties.

BACKGROUND

Articles for use in protecting animals from physical harm and insulating them from harsh environments have been around as long as animals have been held as domestic pets and as valuable undomesticated animals. With the increased domestication and integration into family life of household pets, it has become increasingly popular to include pets in all family events, exposing them to environments that are atypical to their breed or vary from their day-to-day lives. It is also increasingly popular to afford domestic pets human luxuries such as fashionable outerwear.

Prior art garments that protect common household pets, for example, dogs, during field exercises or hunting conditions, include complex shapes and pads having multiple pieces that need to be secured together on the animal and, depending on the level of protection required, are bulky and cumbersome.

Prior art garments with insulating properties further comprise multiple pieces requiring at least partial assembly on the animal. Such devices incorporate numerous points of attachment around the animal, requiring difficult movements by the user, such as bending and kneeling down for an extended period, to position the garment on the animal and then secure it. The highly active nature of animals, particularly canine puppies and young dogs, renders the difficult and complex installation of such garments even more trying. Prior art insulating garments further fail in many instances from adequately insulating the upper ears, neck and chest portions of animals and are not readily adaptive to protect the head without bulky hoods or caps.

Prior art designs due to the complex, multi-piece design and attachment schemes noted above, further make the garment expensive, difficult to manufacture and more importantly, difficult to install and use both for the user and the animal.

Consequently, it would be desirable to provide an animal coat improving on the problematic conditions in the prior art and to provide a coat which is inexpensive, facilitates manufacturing and assembly, and is easy to secure, use and remove while affording substantial protection to the animal from harsh environments.

SUMMARY

The inventive coat for placement over the body or torso of a dog or other animal comprises a front portion and a neck portion positioned in surrounding relation to the animal's neck forming an opening to place the animal's head through. The coat further includes first and second sides extending rearward over the body of the animal ending in a rear portion adjacent the animal's hind quarters. The animal coat includes at least one lateral strap positioned rearward of the front legs extending from one of the sides underneath the animal and attaching to the opposing side. A chest strap attached to the neck portion extends rearward between the front legs and is easily and removably secured to the lateral strap beneath the chest of the animal.

In a preferred aspect of the invention, the coat substantially covers the body rearward of the ears and includes a first and an opposing second lateral strap positioned around the lower chest rearward of the front legs. The first and second lateral straps include a first means for attaching the straps together in an overlapping manner in the form of complementary hook-and-loop material patches, for example, attached to the respective straps. The chest strap extends rearward substantially covering the chest area and removably attaches in an overlapping manner to at least one of the first and second lateral straps by a second means for attachment, preferably, opposing hook-and-loop material patches.

In another preferred aspect of the invention, the front and neck portions of the coat are sufficient in length and clearance to easily pull forward and partially cover the animal's ears and head for protection during intermediate rain, wind gusts or severe weather. In another preferred aspect of the invention, the rear portion of the cover adjacent the animal's hind quarters is extended and tapered to conform to the general shape of the animal to further protect this area.

These and other features and advantages of the invention will be apparent upon reading the following specification, which, along with the drawings, describes and discloses preferred and alternate aspects of the invention in detail.

BRIEF DESCRIPTION OF THE DRAWING

The description herein makes reference to the accompanying drawings wherein like reference numerals refer to like parts throughout the several views, and wherein.

DETAILED DESCRIPTION

Figure 1:
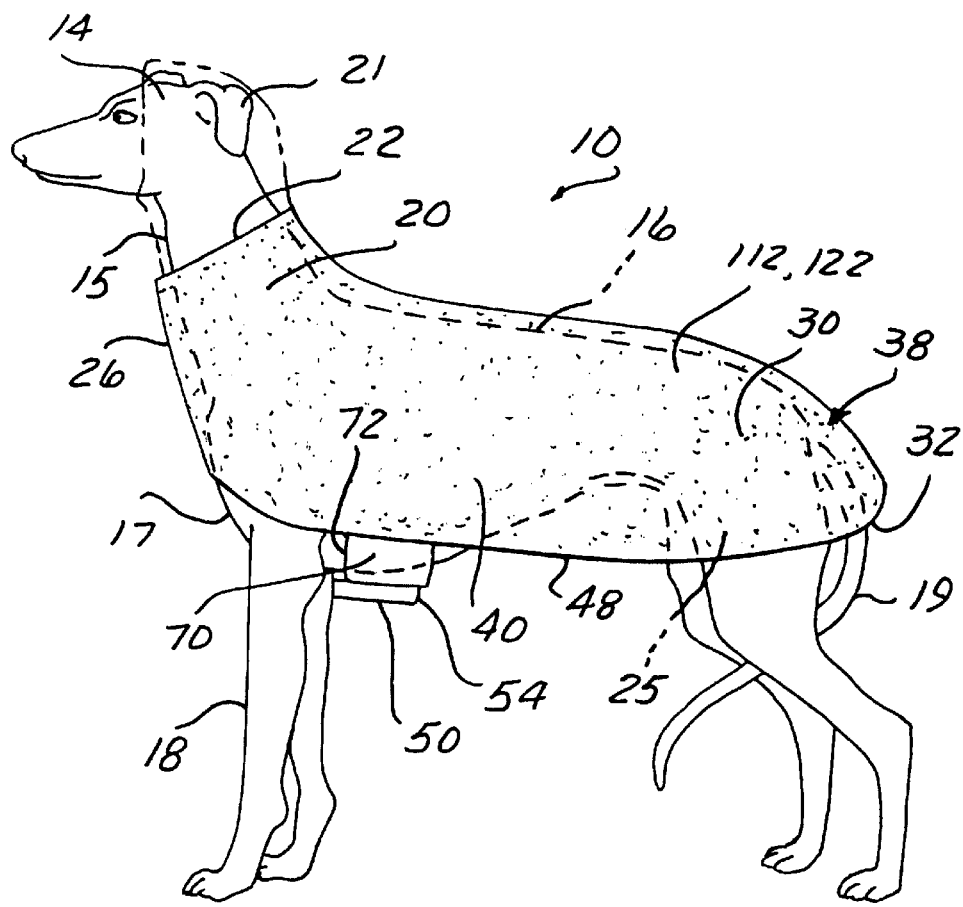
FIG. 1 is a side view of the inventive animal coat as worn by, for example, a dog.
Figure 2:
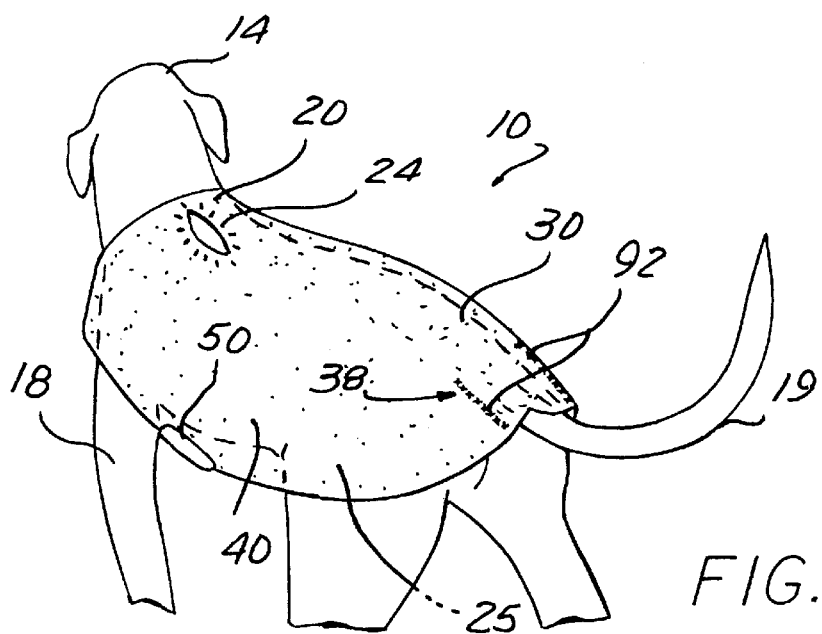
FIG. 2 is a rear perspective view of the animal coat as worn by a dog.

Referring to FIGS. 1–7, an animal coat 10 of the present invention is illustrated. Referring to FIGS. 1 and 2, the animal coat 10 of the present invention is positioned over the body of an animal, for example as illustrated in FIG. 1, a dog. It is understood the invention is equally applicable to any animal having a head 14, neck 15, body or torso 16, chest 17, front legs 18 and hind quarters 25. The invention is equally usable on an animal having a tail 19. While the invention, as will be apparent, is designed for all kinds of domesticated and undomesticated animals, a particularly useful application is for canines and for this reason, and for simplicity of discussion, canines will be primarily referred to hereafter.

Figure 3:
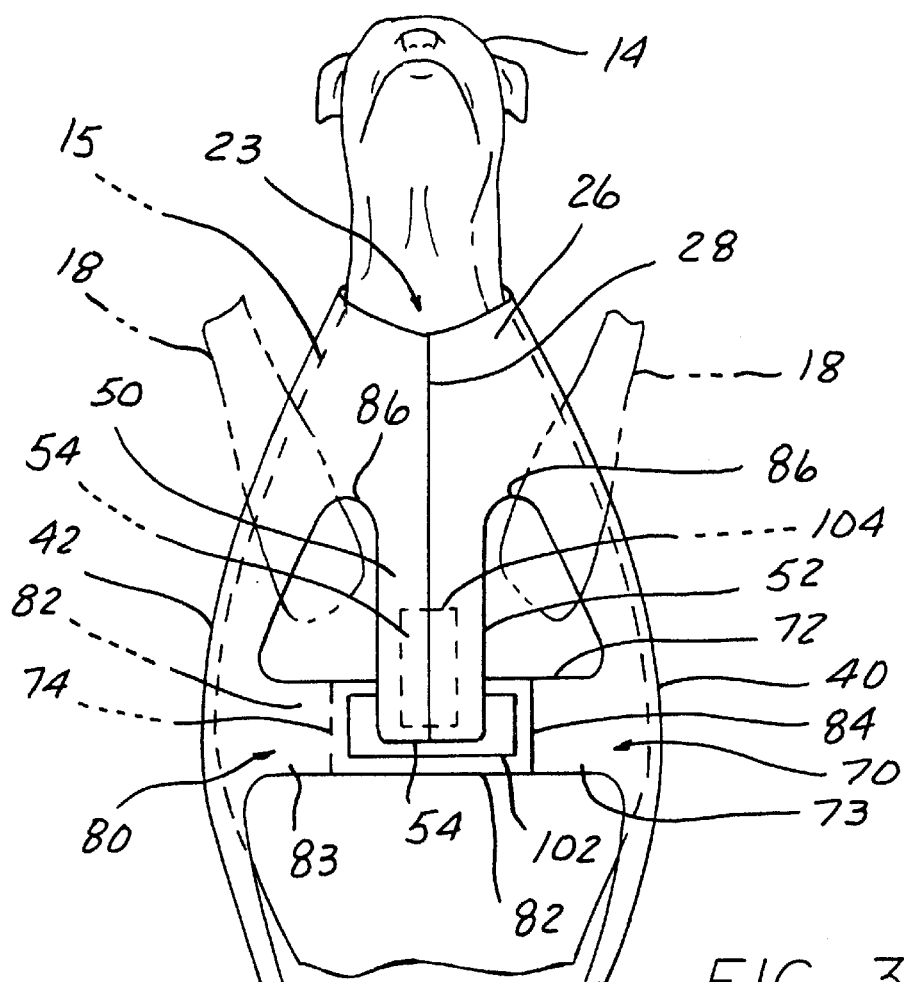
FIG. 3 is a partial bottom view of the animal coat as worn by a dog showing attachment of the first and second lateral straps and the chest strap.
Figure 4:
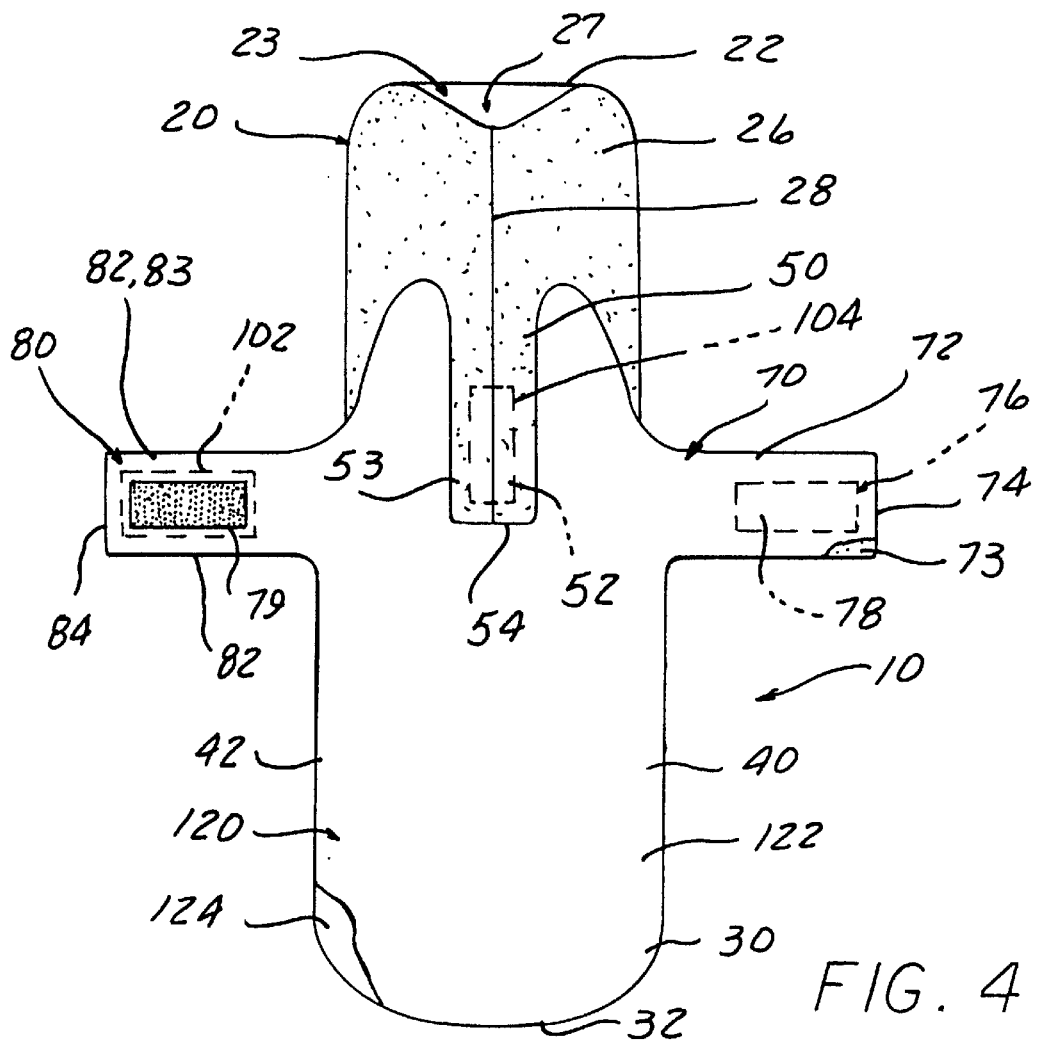
FIG. 4 is a bottom view of the animal coat in showing the first and second lateral straps and the chest strap unattached to one another.

The animal coat 10 includes a front portion 20 and neck portion 26 adapted to be positioned around the neck 15 of the dog as shown in FIGS. 1–3. Front portion 20 has a front edge 22 which is positioned around neck 15 and, in one aspect of the invention, sufficient material is provided so that edge 22 may be extended up neck 15 and positioned over the dog's ears 21 partially covering head 14 or at least substantially covering neck 15 (shown in phantom line in FIG. 1). As best seen in FIGS. 3 and 4, neck portion 26 includes a relief 23 on the underside of the dog's neck 15 which facilitates movement of head 14 and jaw particularly, when front edge 22 is positioned over the dog's ears 21. In a preferred aspect, FIG. 2 shows front portion 20 further including an access opening 24 on the back or top side of coat 10 to permit attachment of a leash or other device to the dog's collar for convenience during walks and other times of desired limited mobility of the dog. Access opening 24 can be positioned in other places on coat 10 to accommodate alternate restraining devices such as harnesses and the like.

Referring to FIGS. 1–3, coat 10 further includes a neck portion 26 which, along with front portion 20, defines an opening 27 through which the dog's head 14 is passed through when installing or removing the animal coat 10 from the dog. Referring to FIGS. 1 and 2, coat 10 further includes a first side 40 and a second side 42 extending rearward from the front portion 20 and neck portion 26 substantially covering the body between the front legs 18 and hind quarters 25. Animal coat 10 further includes a rear portion 30 extending rearward from the first 40 and second 42 side portions adjacent to the hind quarters 25 of the dog. Rear portion 30 includes a rear edge 32. In a preferred aspect of the invention, rear portion 30 includes a tapered portion 38 which extends beyond the intersection of the hind quarters 25 and tail 19 and is contoured to wrap around the hind quarters 25 of the dog as best seen in FIGS. 1 and 2. Depending on the animal or breed of dog, rear portion 30 may alternately be shorter to not cover the tail or longer where the need arises to further protect the animal from the environment.

Referring to FIGS. 1, 3, and 4, coat 10 further includes a chest strap 50 extending from neck portion 26 between the front legs 18 toward the rear of the dog. Chest strap 50 includes a first side 52 adjacent the animal in an installed position, an opposing second side 52 and a rear edge 54. Chest strap 50, when desired, for example, for use in cold temperatures, substantially covers chest 17 of the dog to minimize heat lost leaving openings 86 for the front legs 18 as best seen in FIG. 3. In ambient or high temperatures, chest strap 50 may be narrower to permit increased ventilation while maintaining a secure position on the dog.

Coat 10 further preferably includes a first lateral strap 70 extending from first side 40 of coat 10 as best seen in FIGS. 3 and 4. First lateral strap 70 includes a third side 72 adjacent the dog in an installed position, an opposing fourth side 73 and distal end 74. In a preferred aspect of the invention, first lateral strap 70 is integral with first side 40 and extends underneath the body 16 and chest 17 rearward of front legs 18 and is of sufficient length such that distal end 74 extends beyond the middle of chest 17 as best seen in FIG. 3.

Coat 10 preferably includes an opposing second lateral strap 80. Second lateral strap 80 includes a fifth side 82 adjacent the dog in an installed position, an opposing sixth side 83 and distal end 84. In a preferred aspect of the invention, second lateral strap 80 is integral with opposing side 40 and extends underneath body 16 and chest 17 rearward of front legs 18 and is of sufficient length such that distal end 84 extends beyond the middle of chest 18. In an installed position as shown in FIG. 3, second lateral strap 80 is in substantial alignment and in overlapping fashion with first lateral strap 70.

In an alternate aspect of the invention, first 70 and second 80 lateral straps are unified into a single lateral strap, not shown, which extends from either the first 40 or second 42 side portions and wraps around the underside of the dog to the opposing side portion to be secured to the opposing side portion by a first means for attaching as described further below.

The preferred first 70 and second 80 lateral straps include a first means for attaching 76 the respective straps together when placed in an overlapping fashion as best seen in FIGS. 3 and 4. In a preferred aspect of the invention, first means for fastening includes opposing and complementary hook-and-loop patches, such as VELCRO, attached to the first 70 and second 80 lateral straps. As best seen in FIG. 4, in a preferred aspect of the invention, first lateral strap 70 includes a hook patch 78 sewn into the fourth side 73 (shown as hidden lines). Second lateral strap 80 includes an opposing and complementary loop patch 79 sewn into the fifth side 82.

Second lateral strap 80 further includes a second attaching means 98, preferably, a hook material patch 102 sewn on the sixth side 83 (shown as hidden lines). Chest strap 50 includes the complementary second fastening means preferably, a loop material patch 104, sewn into the first side 52 of chest strap 50 as best seen in FIG. 4 (shown as hidden lines). Second fastening means loop patch 104 as shown on chest strap 50 and hook patch 102 on second lateral strap 80 are positioned such that when second lateral strap 80 is positioned in overlapping fashion with first lateral strap 70, loop patch 104 on chest strap 50 generously overlaps and easily engages with hook patch 102 which is now exposed and directly opposed to loop patch 104 on chest strap 50 as best seen in FIG. 3. It is understood that first lateral strap 70 may be used to overlap second lateral strap 80 provided the hook-and-loop patches on the straps are exchanged between straps.

In an alternate aspect, a single lateral strap, for example, first lateral strap 70, may be used as previously described. In this aspect, not shown, first lateral strap 70 is extended from first side 40 to wrap around chest 17 rearward of front legs 18 and attach to second side portion 42 by the first attaching means 76. In this aspect, first attaching means 76 includes a loop patch, not shown, attached to third side 72 and a complementary hook patch, not shown, is attached to second side portion 42 in a position where the loop patch easily overlaps and engages the hook patch.

Although first attaching means 76 and second attaching means 98 have been described as hook-and-loop fastening patches preferably sewn into first 70 and second lateral straps 80 and chest strap 50, it is understood that other means for fastening could be employed for example, opposing mechanical devices such as snaps, magnetically attractive surfaces, releasable and reusable adhesives, and other similar devices that easily and securely fasten on contact with little or no pressure needed from the installer. Alternate common fastening means such as buttons, hooks and clasps may also be used but are less preferred due to the time and increased physical effort generally required to engage and disengage them.

Animal coat 10 is manufactured from one or more layers of material, the selection of material and number of layers being largely dependent on the animal, environment, the particular need, or the desired effect of the coat 10. In one aspect of the invention, coat 10 is manufactured from 2 layers of material for use in insulating the dog from cold temperatures. A suitable material for cold temperatures is two layers of heavy-weight fleece material that are sewn together with heavy duty stitching as described hereafter. It is understood that other materials having less or additional layers may be used to accommodate the particular animal or environments exposed to including water repellant coatings or fabrics sold under the trademarks EXTREME and GORE-TEX on the aforementioned fleece material or other lightweight materials for mild or warm environments. Equally, very lightweight and/or reflective materials and coatings may be used to help keep an animal cool and protect the animal from harmful sunlight and exposure to ultraviolet rays. It is further understood that the present invention coat 10 may be altered in areas to accommodate the particular animal or environment. For example, in warm climates, it may be desirable to narrow chest strap 50, and/or shorten the front 20 and neck portions 26 such that front edge 22 provides minimal coverage to neck 15 of the animal to maximize heat dissipation in the area. Likewise, rear portion 30 may be shortened to minimally cover the hind quarters 25 of the animal maximizing heat dissipation and freedom of movement.

Referring to FIGS. 1 and 4, in operation, animal coat 10 is applied or installed on the dog by releasing or separating the first 76 and second 98 attaching means by separating chest strap 50 from second lateral strap 80, and second lateral strap 80 from first lateral strap 70 as best seen in FIG. 4. Animal coat 10 is then installed on the dog by placing the dog's head 14 through coat opening 27 and pulling rear portion 30 rearward towards the hind quarters 25 as best seen in FIGS. 1 and 2. In this position, chest strap 50 and first 70 and second 80 lateral straps hang in position adjacent chest 17 and the sides of the dog rearward of front legs 18 respectively. In a preferred aspect of the invention, the installer will grasp first lateral strap 70 and second lateral strap 80 and position first lateral strap 70 across the underside of chest 17 such that distal end 74 extends beyond the centerline or mid portion of chest 17 as best seen in FIG. 3. Simultaneously, or shortly thereafter, second lateral strap 80 will be equally positioned across chest 17 such that distal end 84 extends beyond the center line or mid section of the dog engaging in overlapping fashion first lateral strap 70. In this position, first attaching means 76 on first lateral strap 70 and second lateral strap 80 and placed in engaging relationship which firmly secures the straps to one another adjacent the chest 17. In this position, hook patch 102 on the sixth side 83 of second lateral strap 80 is exposed in a predominantly downward and potentially slightly forward direction as best seen in FIGS. 1 and 3.

In a preferred aspect of the invention, upon securement of first 70 and second lateral strap 80 chest strap 50 is swung or urged between front legs 18 toward the rear of the dog toward the exposed hook patch 102 on second lateral strap 80. The loop patch 104 attached to the first side of chest strap 50, on the momentum imposed by the installer to chest strap 50, or by direct pressure, comes in contact with the opposing hook patch 102 on second lateral strap 80 and secures chest strap 50 in overlapping fashion to second lateral strap 80. Once chest strap 50 is secured to second lateral strap 80, the animal coat 10 is installed and ready for use. Depending on the animal and application, adjustment of one or more areas of coat 10 may be employed to suit the animal or environment for example, extending neck portion 20 and front edge 22 over the dog's ears 21 or fully extending rear portion 30 over the hind quarters 25 of the animal.

Animal coat 10 is removed from the animal in a reverse fashion separating chest strap 50 from second lateral strap 80 and thereafter, second lateral strap 80 from first lateral strap 70. The animal head 14 is then gently placed through coat opening 27.

As seen from the figures and description of the invention, animal coat 10 is easily installable on the animal with minimal effort by the user particularly, securement of chest strap 50 as described in the preferred aspect. When secured in place, chest strap 50 and first 70 and second lateral straps 80 substantially cover and protect chest area 17 and the underside of the animal rearward of front legs 18 thereby providing substantial protection of the vital areas of the animal from foreign objects and harsh environments. In position toward the rear of the animal, chest strap 50 is not easily dislodged as in forward motion of the animal, grass and other debris urge chest strap 50 rearward further fortifying engagement of second attaching means 98. This attaching arrangement in effect provides a double locking device preventing undesired dislodgement, yet is easy to install and remove through simple movements by the installer.

In a preferred aspect of the invention, coat 10 is reversible so that in an alternate orientation, the inner material, normally against the dog's skin or fur, is worn as the outer surface away from the dog's fur. This is accomplished by turning the front 20 and neck 26 portions inside out as can be visualized from FIG. 4 (shaded portion inverted to be on the inside or nonvisible side of opening 27). In this alternate, reversed orientation, application on the dog is similar except that chest strap 50 is first placed against the chest 17 followed by second lateral strap 80 in overlapping fashion of chest strap 50 to engage second attaching means 98 to hold chest strap 50 and second lateral strap 80 in position underneath the chest 17. First lateral strap 70 is then positioned underneath chest 17 and placed in overlapping relation to second lateral strap 80 thereby engaging first attaching means 76 in a similar fashion. This ability of being able to alternate the material exposed to the elements and the dog provides flexibility in the usage and extends the useful and cosmetic life of coat 10.

Figure 7:
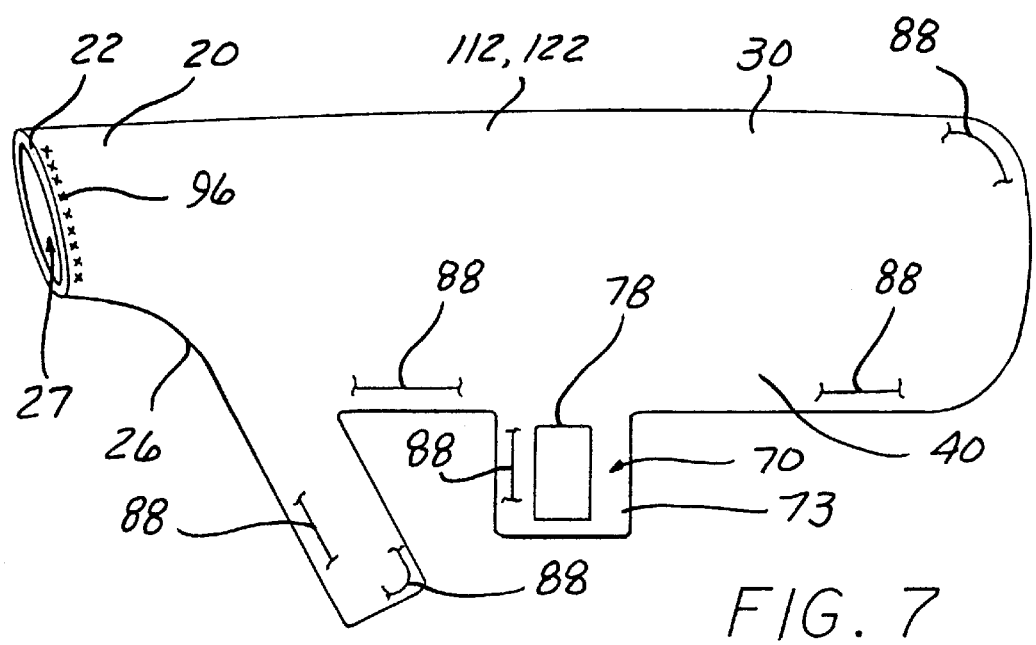
FIG. 7 is a side view of a two material animal coat in a late stage of assembly.
Figure 5:
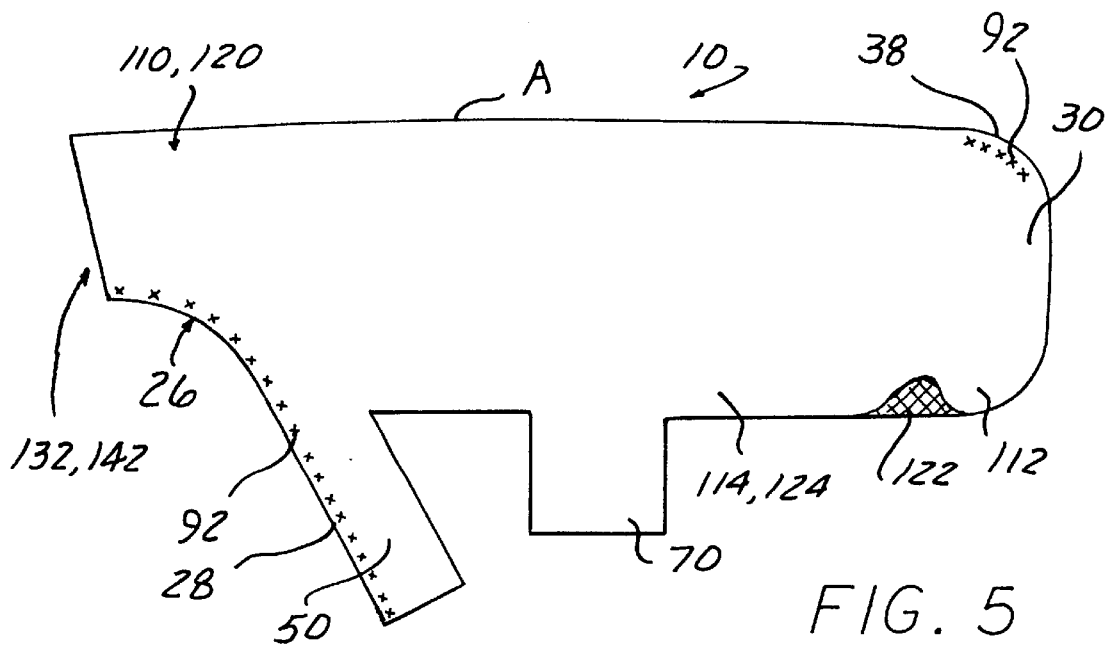
FIG. 5 is a side view of a two material layer animal coat in an early stage of assembly showing a partial cut-a-way of material.
Figure 6:
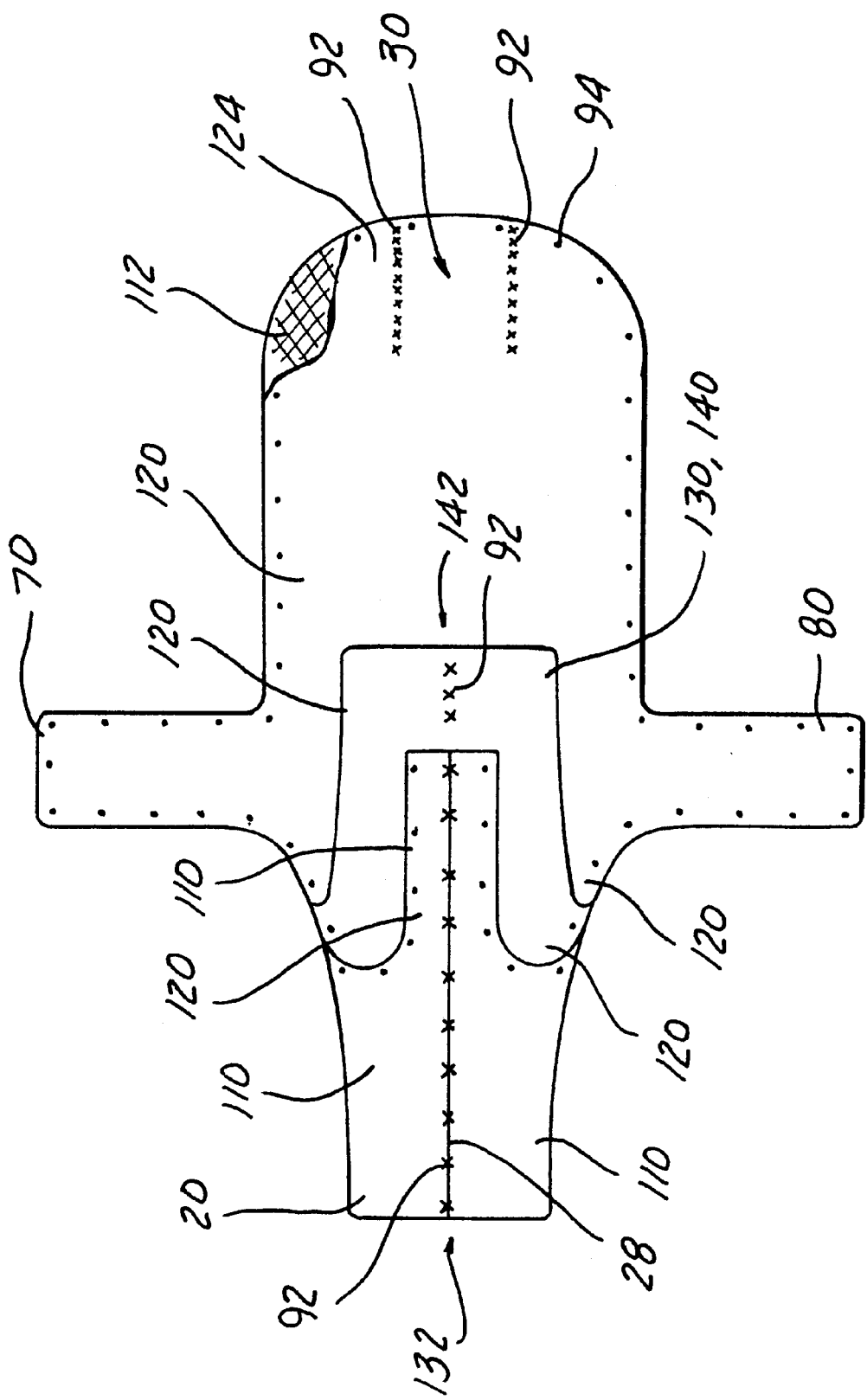
FIG. 6 is a top view of a two material layer animal coat in a subsequent stage of assembly showing a partial cut-a-way of material.

In a preferred aspect of the invention, animal coat 10 is made from a first layer of material 110 and a second layer of material 120 that are sewn together as best seen in FIGS. 4–7. Referring to FIGS. 5–7, the preferred method of making and assembling a two material layer animal coat 10 is illustrated and described. Referring to FIG. 5, a first layer 110 of raw or bulk material having a first thickness, a first side 112 serving as the intended finished product outer surface (shown hatched for purposes of clarity) and a second side 114 is folded along line A such that the first sides 112 face one another and the second sides 114 face outward. A pattern (not shown) having a shape substantially similar to that shown in FIG. 5 and previously described is used to cut coat 10 from the overlapping, double thick first material 110. The pattern is removed and the two thicknesses of material are then sewn together with stitches, for simplification illustrated as "×" 92 along the neck portion 26 and chest strap 50 forming a center seam 28, first chest strap 130, first head opening 132 and rear taper 38 as shown in FIG. 5. The order of sewing in this operation is not important. Where a two material layer coat 10 is desired, this cutting and sewing process is carried out a second time on a second layer of material 120 having a second thickness, third side 122 intended to be the outer/finished side and a fourth side 124. This produces a second chest strap 140, second head opening 142, a center seam 28 and a rear taper 38 substantially identical to first material layer 110. Material layers 110 and 120 may be from the same or different material depending on the performance and aesthetic characteristics desired.

When constructing a two layer coat 10, an assembler would take one of the material pieces for example, first material layer 110, and separate the unsewn thicknesses from one another and place layer 110 flat on a surface with the intended outer surface, side 112, facing in an upward or exposed direction. The second material layer 120 is opened up in a similar fashion, turned over and laid flat atop the first layer 110 such that third/finish side 122 is facing down and aligned with first side 112 as shown in FIG. 6. Stitches, for simplicity illustrated as "·" 94, are used to sew the first 110 and second 120 material layers together adjacent the outer edges of the first 130 and second 140 chest straps, forming chest strap 50, lateral straps 70 and 80, side portions 40 and 42, and rear portion 38 illustrated in FIG. 6. At this stage, material layers 110 and 120 are joined together along the entire periphery except along front edges 22 leading to first head opening 132 and second head opening 142 as illustrated in FIG. 6.

Following attachment by stitches 94, the maker will reach through opening 132 or 134 and turn the entire assembly inside-out from itself by the gentle pulling of material layers 110 and 120 through and out opening 132 or 134 which, when completed, leaves the user with the sewn coat 10 having finished sides 112 and 122 on the outside or exposed surface of coat 10 as best seen in FIG. 7.

Following this procedure, and minor manipulation of material including front portions 20, and first 132 and second 142 head openings in concentric orientation to one another forming opening 27, additional stitches 96, for simplicity shown as "+," are placed circumferentially around front edge 22 joining first material layer 110 and second material layer 120 together around opening 27 without compromising the through opening 27. First 110 and second 120 material layers are lastly and preferably joined by topstitch-type stitching 88 all along the peripheral edges as shown in FIG. 7 for strength and added appearance. Although described as first applying stitches 96 prior to topstitches 88, the order of sewing may be reversed.

The first attaching means 76 and second attaching means 98 hook-and-loop patches are now sewn on the first lateral strap 70, second lateral strap 80 and chest strap 50 as illustrated and described above. In a preferred aspect, as best seen in FIG. 4, a patch having hooks 78 is sewn to the fourth side 73 of first lateral strap 70 as well as hook patch 102 to the sixth side 83 of second lateral strap 80. Loop patches 79 and 104 are preferably sewn to fifth side 82 of second lateral strap 80 and first side 52 of chest strap 50 respectively.

In a preferred aspect of the invention, an access opening 24 is then cut through the coat 10 where desired and the raw edges are sewn and finished similar to a button hole to prevent tearing or fraying as best seen in FIG. 2. This opening may be used to access the animal's collar or harness to attach a leash or other lead.

Where it is desired for coat 10 to alternately be made from a single layer of material, for example, first material layer 110, the process similarly begins with folding the material 110 along line A and cutting the double layers in a shape similar to that shown in FIG. 5. Stitches "X" 92 along the neck portion 26 and chest strap 50 are made to form first opening 132 as previously described. The partially sewn assembly is then turned inside out by pulling the material through first opening 132 as previously described. The alternate coat 10 is completed by preferably folding over of the raw peripheral edges and sewing the folded over edging using topstitch-type stitching 88 along the peripheral edges and circumference of first opening 132, forming opening 27 to prevent fraying and to make a finished looking edge and product.

What is claimed is:

1. An animal coat for use on an animal having a head, a neck, a chest, a body, front legs and hind quarters, the animal coat comprising:
   a front portion and a neck portion, the front and the neck portions positionable in surrounding relation to the neck of the animal defining an opening adapted to receive the animal head therethrough;
   a first side portion and an opposing second side portion extending rearward from the front portion and the neck portion positionable adjacent to the animal body;
   a chest strap extending from the neck portion rearward positionable between the animal front legs adjacent the animal chest;
   at least one lateral strap extending from the first side portion rearward of the animal front legs, the lateral strap having a distal end opposite the first side portion;
   first means for removably attaching the distal end of the lateral strap to the second side portion in surrounding relation to the animal chest; and
   second means for removably attaching the chest strap in overlapping relation to the lateral strap beneath the animal chest.

2. The animal coat of claim 1 wherein the at least one lateral strap further comprises a first lateral strap extending from the first side portion partially around the animal chest and an opposing second lateral strap extending from the second side portion partially around the animal chest, the second lateral strap removably overlappingly attached to the first lateral strap by the first means for attachment.

3. The animal coat of claim 2 wherein the first means is positionable beneath the animal chest.

4. The animal coat of claim 2 wherein the first and the second lateral straps are approximately equal in length and extend beyond a mid-portion of the animal chest.

5. The animal coat of claim 1 wherein the front portion and the neck portion are adapted to be pulled forward over the animal neck and cover a portion of the animal head.

6. The animal coat of claim 1 wherein the neck portion defines a relief under the animal head for increased movement of the animal head.

7. The animal coat of claim 1 further comprising a rear portion extending from the first and the second side portions adjacent to the animal hind quarters.

8. The animal coat of claim 7 wherein the rear portion includes a tapered portion partially covering the animal hind quarters.

9. The animal coat of claim 1 wherein at least one of the first attaching means and the second attaching means comprises opposing and complementary hook and loop material patches.

10. An animal coat for use on an animal having a head, a neck, a chest, a body, front legs and hind quarters, the animal coat comprising:
   a front portion and a neck portion, the front and the neck portions adapted to be positioned in surrounding relation to the animal neck and define an opening adapted to receive the animal head therethrough;
   a first side portion and an opposing second side portion extending rearward from the front portion and the neck portion adjacent the animal body;
   a chest strap extending from the neck portion rearward between the animal front legs adjacent the animal chest, the chest strap having a first side adjacent the animal body and an opposing second side;
   a first lateral strap extending from the first side portion rearward of the animal front legs, the first lateral strap having a third side adjacent the animal body and an opposing fourth side;

a second lateral strap extending from the second side portion rearward of the animal front legs, the second lateral strap having a fifth side adjacent the animal body and an opposing sixth side;

first means for removably attaching the first and the second lateral straps in overlapping relation to one another around the animal chest; and second means for attaching the chest strap to at least one of the first and the second lateral straps in overlapping relation adjacent the animal chest.

11. The animal coat of claim 10 wherein the first means for attachment is positioned on the fourth side of the first lateral strap and the fifth side of the second lateral strap side for overlapping and aligned engagement of the fifth side over the fourth side.

12. The animal coat of claim 10 wherein the second means for attachment is positioned on the first side of the chest strap and the sixth side of the second lateral strap for overlapping and aligned engagement of the first side over the sixth side.

13. The animal coat of claim 10 wherein the front and the neck portions are adapted to be pulled up the animal neck and cover a portion of the animal head.

14. The animal coat of claim 10 wherein at least one of the first and the second attaching means comprises opposing and complementary hook and loop material patches.

* * * * *